US010378160B2

(12) United States Patent
Walker et al.

(10) Patent No.: US 10,378,160 B2
(45) Date of Patent: Aug. 13, 2019

(54) SYSTEMS AND METHODS OF DETERMINING ROAD QUALITY

(71) Applicant: Freeport-McMoRan Inc., Phoenix, AZ (US)

(72) Inventors: Mary Amelia Walker, Phoenix, AZ (US); Robert Catron, Phoenix, AZ (US); Brian Vaughan, St. Louis, MO (US); Hung Jung Lu, St. Louis, MO (US)

(73) Assignee: Freeport-McMoRan Inc., Phoenix, AZ (US)

(*) Notice: Subject to any disclaimer, the term of this patent is extended or adjusted under 35 U.S.C. 154(b) by 241 days.

(21) Appl. No.: 15/376,044

(22) Filed: Dec. 12, 2016

(65) Prior Publication Data

US 2017/0167088 A1 Jun. 15, 2017

Related U.S. Application Data

(60) Provisional application No. 62/267,518, filed on Dec. 15, 2015.

(51) Int. Cl.
*E01C 23/01* (2006.01)
*G01M 17/04* (2006.01)
(Continued)

(52) U.S. Cl.
CPC ............. *E01C 23/01* (2013.01); *G01M 17/04* (2013.01); *G06Q 10/06* (2013.01); *G06Q 10/20* (2013.01);
(Continued)

(58) Field of Classification Search
CPC ....... E01C 23/01; G01M 17/04; G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/06; G01M 17/08; G01M 1/02; G01M 1/045; G01M 1/12; G01M 1/225; G01M 3/40;
(Continued)

(56) References Cited

U.S. PATENT DOCUMENTS 5,962,980 A * 10/1999 Kluge et al. ........... B60Q 1/115
307/10.8
7,397,392 B2 7/2008 Mahoney et al.
(Continued)

OTHER PUBLICATIONS

PCT International Search Report and Written Opinion, dated Mar. 2, 2017, corresponding to PCT Application No. PCT/US2016/066386, 11 pages.
(Continued)

*Primary Examiner* — Andre J Allen
(74) *Attorney, Agent, or Firm* — Fennemore Craig, P.C.

(57) ABSTRACT

A system for determining road quality includes a vehicle equipped with sensors to detect a position of the vehicle on the road and a suspension strut parameter indicative of road quality. The suspension strut parameter may be suspension strut pressure or suspension strut cylinder stroke. A threshold range is established outside of which an absolute value of the suspension strut parameter is associated with poor road quality. A computerized system generates a heat map to display relative quality of road segments.

25 Claims, 7 Drawing Sheets

(51) Int. Cl.
*G06Q 10/06* (2012.01)
*G06Q 10/00* (2012.01)
*G06Q 50/02* (2012.01)
*G06Q 50/08* (2012.01)
*G06Q 50/30* (2012.01)

(52) U.S. Cl.
CPC ............ *G06Q 50/02* (2013.01); *G06Q 50/08* (2013.01); *G06Q 50/30* (2013.01)

(58) Field of Classification Search
CPC ...... G01M 5/0091; G01M 7/02; G01M 99/00; G01M 99/002
USPC .......................................................... 73/146
See application file for complete search history.

(56) References Cited

U.S. PATENT DOCUMENTS

| | | | |
|---|---|---|---|
| 7,421,334 B2* | 9/2008 | Dahlgren et al. ...... | G07C 5/008 340/989 |
| 7,769,561 B2 | 8/2010 | Yuan et al. | |
| 8,392,483 B2 | 3/2013 | Lawrence | |
| 8,559,937 B2 | 10/2013 | Ram et al. | |
| 8,655,823 B1 | 2/2014 | Kumar | |
| 8,694,241 B1 | 4/2014 | Kadous et al. | |
| 8,870,057 B2 | 10/2014 | Campbell et al. | |
| 8,886,574 B2 | 11/2014 | Yuan et al. | |
| 9,108,640 B2* | 8/2015 | Jackson ................ | B60W 40/06 |
| 2001/0044685 A1 | 11/2001 | Schubert | |
| 2004/0122580 A1* | 6/2004 | Sorrells ................. | G07C 5/008 701/80 |
| 2005/0065711 A1 | 3/2005 | Dahlgren et al. | |
| 2005/0216826 A1 | 9/2005 | Black et al. | |
| 2012/0005248 A1 | 1/2012 | Garudadri et al. | |
| 2012/0271504 A1 | 10/2012 | Reiners et al. | |
| 2015/0183440 A1* | 7/2015 | Jackson ................ | B60W 40/06 701/31.4 |
| 2015/0184348 A1 | 7/2015 | Stracke, Jr. | |
| 2015/0356796 A1* | 12/2015 | Jackson ................ | B60W 40/06 701/32.3 |
| 2016/0258118 A1* | 9/2016 | Jinno et al. ........... | B60W 40/06 |
| 2019/0051066 A1* | 2/2019 | Jackson ................ | B60W 40/06 |

OTHER PUBLICATIONS

Australian Examination Report No. 1 for standard patent application, Australian Patent Application No. 2016370479, dated Dec. 21, 2018, 4 pages.

* cited by examiner

SYSTEMS AND METHODS OF DETERMINING ROAD QUALITY

RELATED APPLICATIONS

This application claims benefit of priority to U.S. provisional patent application No. 62/267,518 filed Dec. 15, 2015, which is hereby incorporated by reference the same extent as though fully replicated herein.

BACKGROUND

1. Field

The presently disclosed instrumentalities relate to systems and methods of managing vehicle travel in general and, more particularly, to systems and methods of utilizing vehicle to assess road quality.

2. Description of the Related Art

Open pit mines utilize fleets of specialized vehicles that are specially adapted for heavy haul utilization. These vehicles include, for example, the Model 793F, 797F and MT4400D AC vehicles manufactured by Caterpillar of Peoria, Ill., which have nominal payload capacities ranging from 221 to 363 metric tonnes. These vehicles may be purchased on commercial order equipped with controller area network (CAN) systems.

Data from heavy haul vehicles may be broadcast for use at a monitoring station. This is shown, for example, in U.S. Pat. No. 7,987,027, which shows use of CAN technology on mining vehicles. A wireless transmission system provides for data download/upload functionality to an off-board monitoring system. The wireless transmission system preprocesses acquired machine data and combines data sets to reduce bandwidth in accommodating low-frequency, low bandwidth networks of a type commonly used in mines.

CAN systems such as these provide an overwhelming amount of data concerning the status of various vehicle components. System readings may include, without limitation, what gear the vehicle is operating in at a particular time; compositional analysis of engine exhaust contents such as soot, fuel vapor, carbon monoxide and the like; pressure differentials across such engine components as filters, blowers and the like; tire pressure; alternator output; battery voltage; temperatures including coolant temperature, oil temperature, cab temperature, brake temperature, external temperature and the like; intervals of brake activation; intervals of acceleration and deceleration; windshield wiper activation; grade of road; steering patterns indicative of operator fatigue; hydraulic pump output pressure; quantity of fuel on board, and suspension strut gas pressure. Utilization of this data is typically directed towards analytics for maintenance needs or monitoring of individual vehicles to assure operations within parameters as required under vehicle warranty. Generally speaking, the analytics have not progressed beyond these factors to facilitate improved fleet operations.

SUMMARY

The presently disclosed instrumentalities overcome the problems outlined above and advance the art by providing transport vehicle diagnostics that may be utilized to improve vehicle fleet operations. In particular, the vehicle diagnostics include assessing road quality to recommend and/or automate road maintenance operations.

According to one embodiment, a method of determining road quality includes traversing the road with a vehicle. As this happens a position of the vehicle is tracked as the vehicle traverses one or more segments of the road. A suspension strut parameter of the vehicle is also tracked in association with the vehicle position as the vehicle traverses the road. A threshold range of the suspension strut parameter is established such that values outside of this threshold range indicate of poor road quality. A determination is then made of instances where an absolute value of the suspension strut parameter exceeds the threshold value as an indicator of poor road quality associated with a portion of the road. The road quality may then be reported for road inspection and/or maintenance operations to occur.

In one aspect, the foregoing method may be implemented utilizing program logic in a network system. The system includes a vehicle having at least one suspension strut. A sensor is operatively associated with the suspension strut of the vehicle for sensing a suspension strut parameter indicative of road quality. A position sensor is operatively associated with the vehicle for determining a position of the vehicle on the road. A vehicle network mounted on the vehicle is operatively configured for transmitting output representative of the suspension strut parameter and the position of the vehicle. A telecommunications network is constructed and arranged for communicating data between the vehicle network and a central computing location. The vehicle network and the central computing location are provided with program logic for implementing the method.

In one aspect, a non-transitory computer-readable storage medium has computer-executable attractions embodied thereon that, when executed by at least one computer processor cause the processor to execute the foregoing method. The non-transitory computer-readable storage medium may be, for example, a computer hard drive, a flash memory stick, or a CD-ROM.

BRIEF DESCRIPTION OF THE DRAWINGS

Illustrative and presently preferred exemplary embodiments of the invention are shown in the drawings in which.

DETAILED DESCRIPTION

Figure 1:
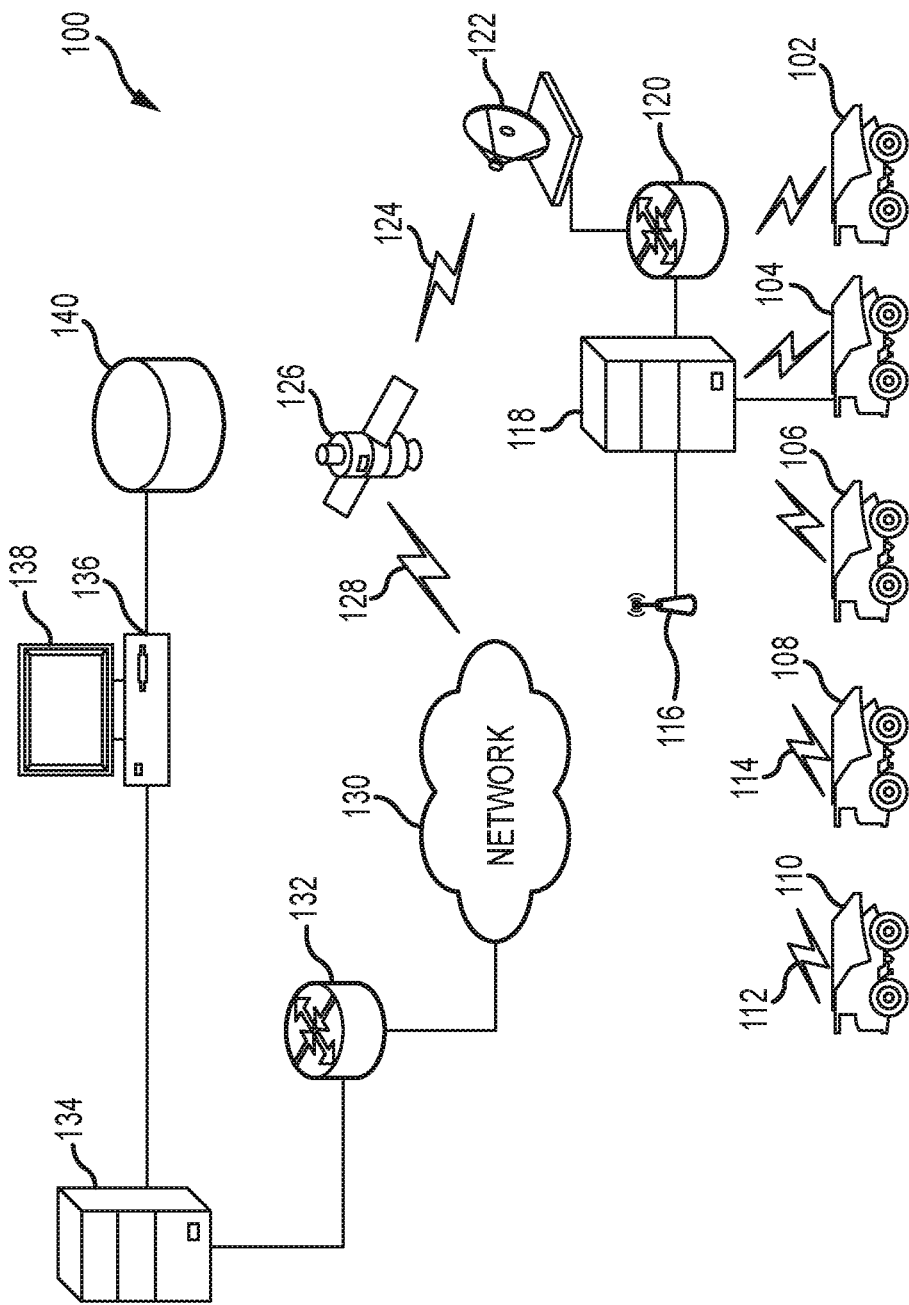
FIG. 1 is a schematic representation of one embodiment of a system for assessing road quality according to the presently disclosed instrumentalities.

FIG. 1 shows one embodiment of a system 100 used to determine road quality on the basis of measurements obtained by one or more vehicles, such as haul trucks 102, 104, 106, 108, 110. Each of the haul trucks 102-110 is equipped with a two-way wireless communications linkage, such as linkages 112, 114 respectively incorporated in haul tucks 108, 110. The linkages 112, 114 are in wireless communications with one or more wireless access points 116, such as a radio tower or a Bluetooth Scatternet, which is constructed and arranged to provide wireless communications from a remote location such as an open pit mine or lumbering operation. The wireless access point 116 communicates data to and from a server/router combination 118/120. The router 120 processes packetized communications from the remote location through satellite dish 122, utilizing communications linkage 124 to communicate with a satellite network 126. The satellite network 126 communicates through commercial linkages 128 established by one or more commercial service providers to gain access to the Internet 130 for communication with router/server combination 132/134. Data from server 134 are accordingly provided to computer 136 and stored on database 140. It will be appreciated that the computer 136 with associated display 138 and database 140 may be located at a central location, but also that the associated computing and data storage functionalities described below may be distributed, as in the case of distributed databasing and/or massively parallel computing. Moreover, the network design may vary by methods known to the art to accommodate an infinite number of hardware choices based upon the need of any particular location. For example, the satellite 126 is unnecessary if there is a different telecommunications network available, or if the central computer 136 is located at a remote location such as a mine. There may be any number of haul trucks 102-110, and the computer 136 may be used to monitor more than one remote location.

The haul trucks 102-110 form a fleet of trucks in used at a particular location, such as a mine where the trucks are utilized to haul earthen materials from the mine. Each of these trucks are equipped with a vehicle network (not shown). The respective vehicle networks provide data sense and reporting functionalities that facilitate monitoring of vehicle components. Vehicle networks include, for example, Local Interconnect Networks ("LIN;" see ISO 9141 and ISO 17987) suited for low date rate applications, CAN (see ISO11898) for medium data rate applications; and FlexRay (ISO 17458) for safety critical applications. A haul truck may contain more than one vehicle network.

Commercially available vehicle networks most frequently operate using the CAN protocol. CAN is a multi-master serial bus standard for connecting Electronic Control Units, which function as nodes on the CAN. Two or more nodes are required on the CAN network to communicate. The node may be a simple I/O device or an embedded computer with a CAN interface and sophisticated software. The node may also be a gateway allowing a standard computer to communicate over a USB or Ethernet port to the devices on a CAN network. CANs have been used to monitor sensors in a variety of application including, without limitation, brake sensors, wheel sensors, pitch/roll/yaw sensors, fluid level sensors (fuel, oil, hydraulic fluid, etc.), hydraulic cylinder position sensors, truck bed position sensors, bucket/blade/ implement position sensors, tire health sensors (pressure, temperature, tread, etc.), exhaust sensors (temperature, NOx, etc.), engine sensors (engine speed, engine load, fuel pressure, boost pressure, etc.), transmission sensors (gear, input/output speed, slip times, etc.), torque converter sensors (input speed, output speed, temperature, etc.), various other machine parameter sensors (payload, strut pressure, machine speed, etc.), and various operator cabin sensors (vibration, ignition key presence/position, seat position, seat belt position, door position, and settings/positions of operator controls, etc.).

Figure 2:
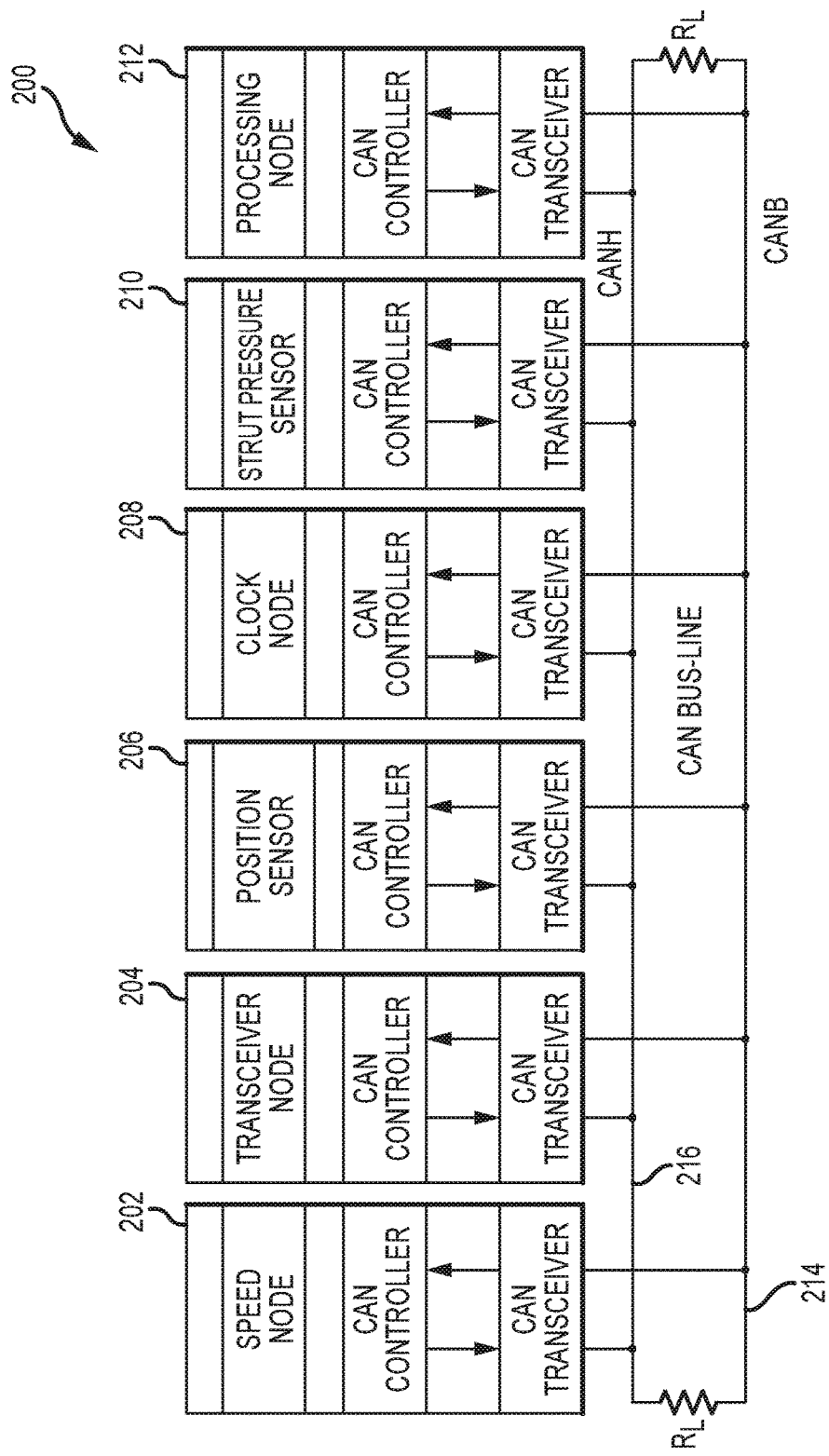
FIG. 2 shows a vehicle network that may be used to equip one or more of the vehicles of FIG. 1.

FIG. 2 shows a network schematic that represents individual vehicle networks found on each of the haul trucks 102-110. As illustrated, the network 200 is a controller area network ("CAN"), but in alternative embodiments may also be a LIN, MOST, FlexRay or other type of vehicle network.

Network 200 is a multi-master network utilizing the CAN multi-master architecture as is standardized in the art. Each node, such as nodes 202, 204, 206, 208 210, 212, includes a node controller and a transceiver configured to receive and transmit data on a CAN Bus-line including CANB component 214 and CANH component 216. The components 214, 216 are useful in arbitrating to resolve or arbitrate data low priority versus high priority data transmission conflicts as is known to the art. Each node of nodes 202-212 is configured to provide a particular functionality. Thus, node 202 provides sensor output indicative of vehicle speed. This may be done, for example, by measuring revolutions per minute (rpm) as the rotational speed of a wheel or transaxle using a magnetic pickoff that counts the incidents of magnetic field proximity variations proximate a sensor over an interval of time as an indicator of vehicle speed. As an alternative way to assess vehicle speed, node 202 may provide output indicating vehicle speed as represented on an operator's dashboard display, where the vehicle speed may be determined by any system known to the art. Node 204 is a transceiver configured to transmit and receive data on system 100. Node 206 may provide output from a positon sensor, such as a Global Positioning System (GPS) or other wireless positioning system, such as a pseudolite system or RFID system, to associate vehicle location with a particular time. Alternatively, the position sensor may be an odometer. Node 208 includes a digital clock or timing circuit that may provide a time stamp for any data transmission on network 200. Node 210 provides output representing a vehicle strut pressure. A processing node 212 may filter, delimit, screen or operate on data transmitted for the purposes described herein.

As will be appreciated by those of ordinary skill in the art, the network 200 is not strictly limited to the nodes shown in FIG. 2, nor is it necessary that the network 200 have all of the nodes shown in FIG. 2. By way of example, network 200 may also comprise one or more environmental sensors (not shown), for example, including light sensors, rain sensors, fog sensors, and night sensors as described in European Patent Publication EP19980956367 to Schofield et al., These sensors may be utilized as CAN nodes for sensing certain environmental conditions, such as the presence of rain, snow, or fog, at various locations within the environment. All types of data on the network 200 may be transmitted on system 100 (see FIG. 1). The processing node 212 may also operatively connect to one or more display systems (not shown) to display certain information and data to a driver. It is possible to utilize CAN-based technology to monitor virtually every operational aspect of a vehicle.

Figure 3:
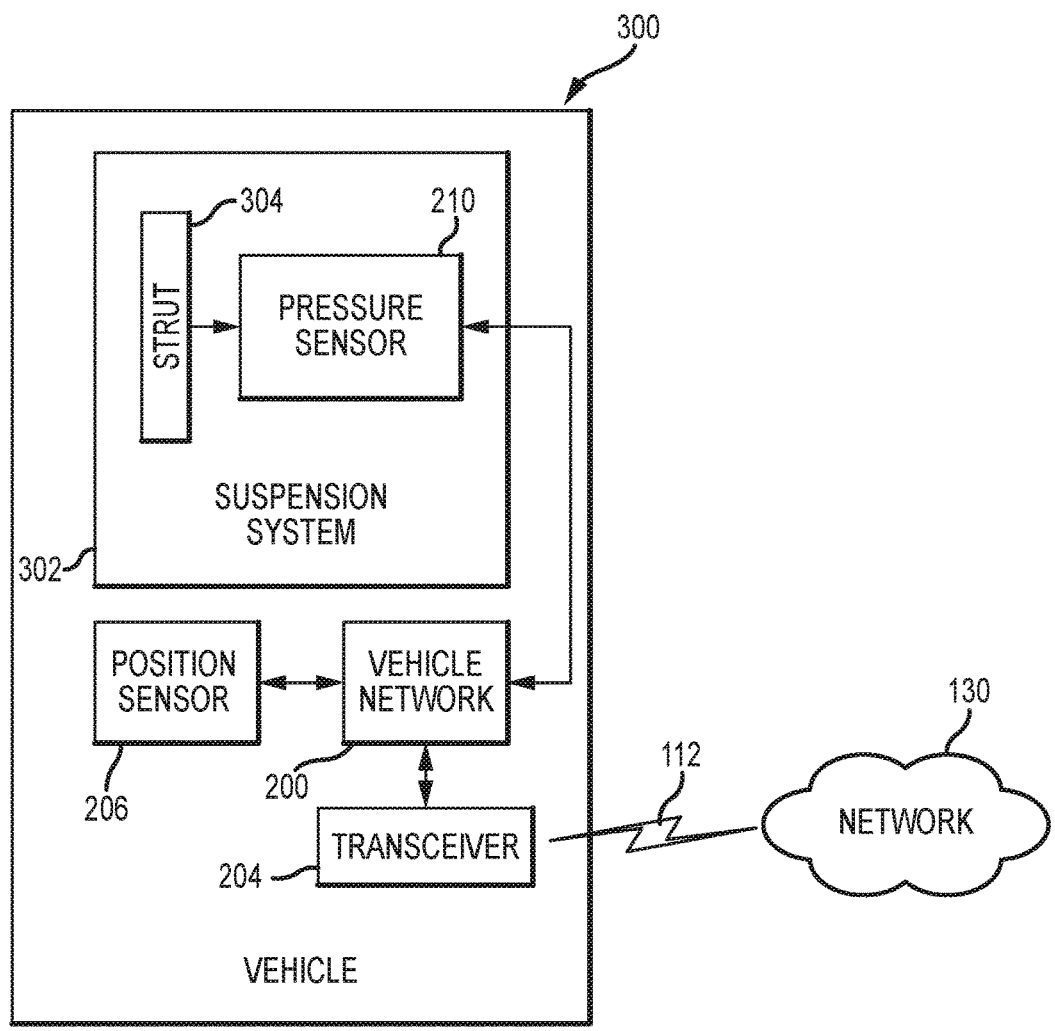
FIG. 3 additional details of the vehicle network concerning a strut pressure sensor, a position sensor, the transceiver, and the vehicle network.

FIG. 3 provides additional information concerning a sensor system 300 that may be utilized for the instrumentalities described herein according to one embodiment. Each of the vehicles 102-110, such as vehicle 110 as shown in FIG. 3, may have a sensor system as shown in FIG. 3. A vehicle suspension system 302 is equipped with a plurality of struts 304, which may be of the gas-liquid variety such as nitrogen-oil. A pressure sensor of node 210 is positioned in the strut to produce output representative of the strut pressure. The pressure sensor may be, for example, a force collector type of sensor such as a piezoresistive strain gauge, variable capacitive diaphragm, variable electromagnetic diaphragm, piezoelectric, or potentiometric wiper. Sensor output is preferably digitized for transmission on the vehicle network 200. Also connected to the vehicle network 200 is the positon sensor node 206, which is configured to provide a position of the vehicle. This may be done, for example, by use of GPS or odometer readings. The positon and pressure data are transmitted on the transceiver node 204 over communications link 112 to network 130 for use as described in context of FIG. 1.

It will be appreciated that pressure monitoring is an optional but preferable way of monitoring the status of struts on a heavy haul vehicle. Where, for example, the effective front cylinder stoke of a Caterpillar 793F is about 13 cm (about 5.1 inches) and the rear effective stroke is about 10.7 cm (about 4.2 inches), it is alternatively possible to monitor cylinder stroke position as an indicator of force applied to the respective cylinders commensurate with a responsive cylinder pressure change. It is also possible to utilize an accelerometer located proximate a strut to produce signals representative of applied force commensurate with a responsive pressure change. As used herein, unless specifically stated otherwise, a "suspension strut parameter" includes at least the actual pressure of a strut, strut cylinder motion, and an accelerometer reading indicative of strut motion.

Figure 4:
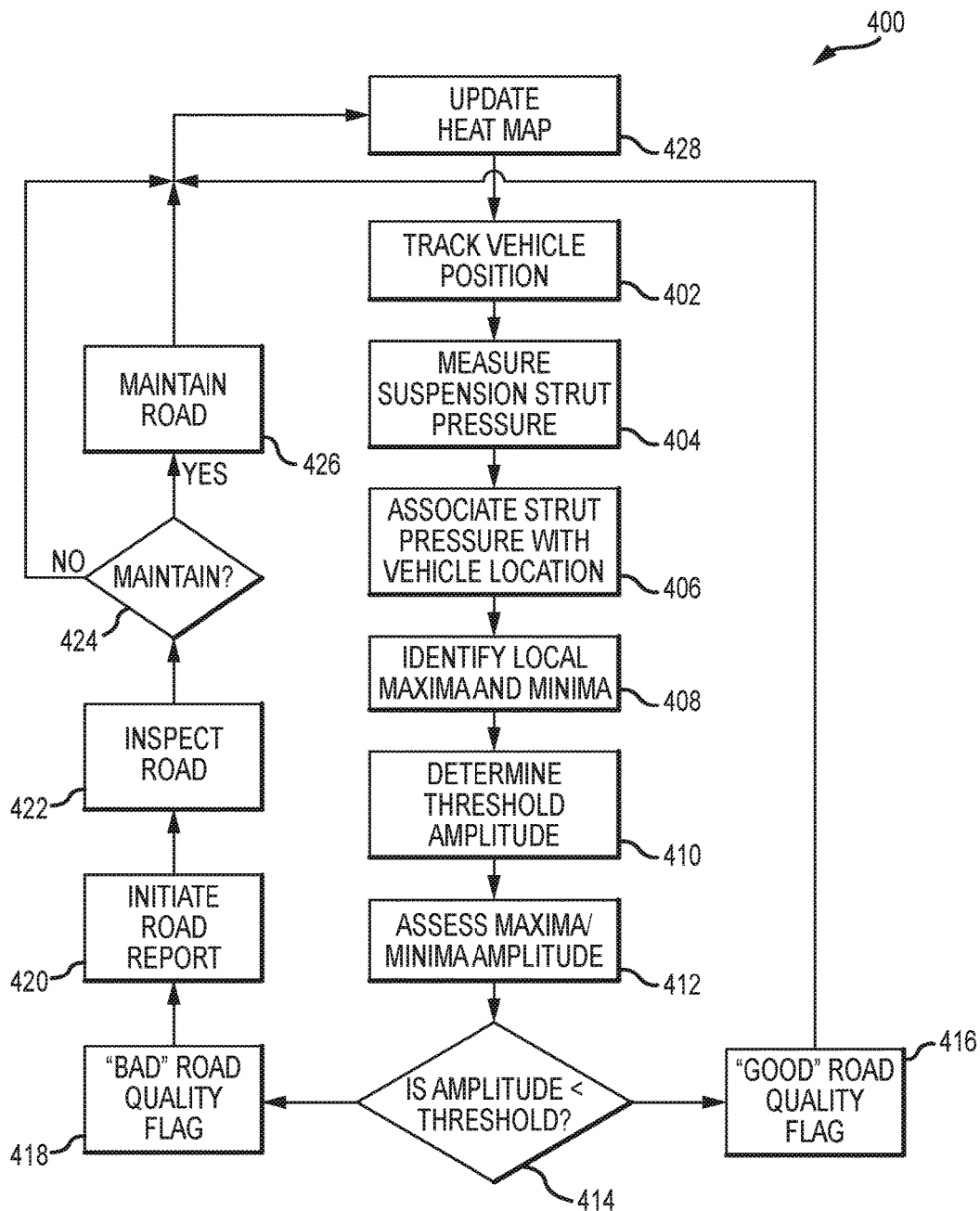
FIG. 4 is a flow chart of one embodiment of a method of determining road quality by use of suspension strut parameter data where the method of FIG. 4 may be implemented as software programming a computer with machine instructions for the performance of this method.
Figure 5:
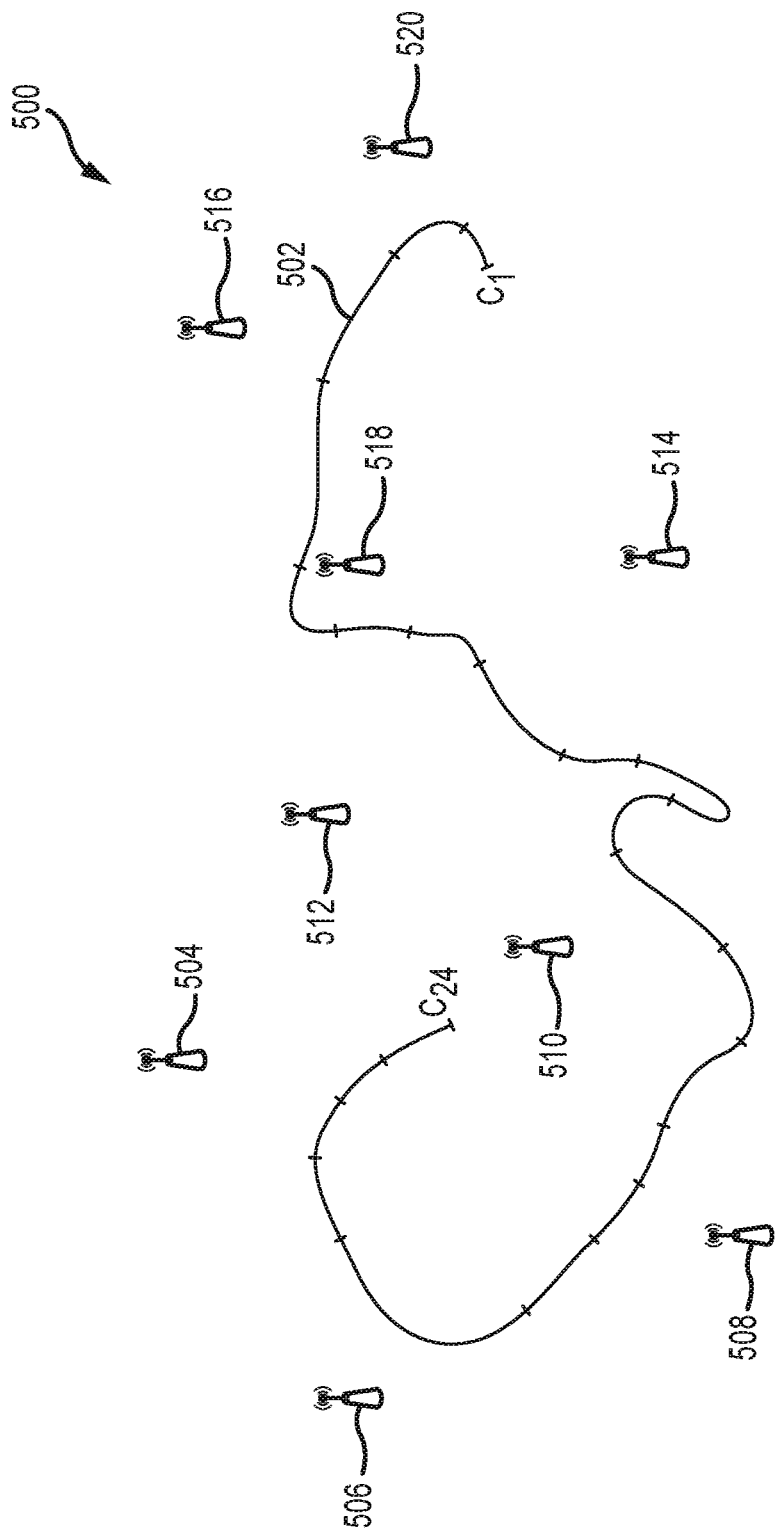
FIG. 5 shows a mining road that is subjected to road quality determinations utilizing a fleet of vehicles operating according to the method of FIG. 3.

FIG. 4 shows program logic implementing a method 400 of determining road quality for use as described herein. The program logic may be implemented, for example, on computer 136 of system 100 and/or the processing node 212 of network 200. This is shown, by way of example, in context of a remote location 500 including mine road 502, as shown in FIG. 5. Road 502 extends between a dump site at location $C_1$ and proceeds to a loading point at location $C_{24}$. Transceivers 504, 506, 508, 510, 512, 514, 516, 518, 520 form part of an optional pseudo-satellite system (the transceivers being referred to as pseudo-lites) that provides positional tracking of vehicles at the remote location 500. The pseudolite system may be, for example, a system as described in U.S. Pat. No. 6,031,487 issued to Mickelson.

The system and method of the presently disclosed instrumentalities may be used to advantage to determine road quality 'on-the-fly' and with the actual vehicles and vehicle types that use of road 502 during normal operations. This advantageously dispenses with a requirement to disrupt normal operations in order to conduct a separate survey or evaluation of the road surface. Moreover, the system and method may allow for substantially continuous determination of road quality. This affords system operators with a substantially real-time evaluation of road quality changes. System operators may be able to monitor changes road quality in real time, which allows road maintenance and repair operations to be scheduled appropriately depending upon how quickly the quality of a particular segment of the road may be degrading. For example, rapid degradations in road quality may be addressed immediately, whereas slowly degrading road segments may be scheduled for maintenance at a regularly scheduled time.

Referring now primarily to FIG. 4, a first step of method 400 may entail tracking 402 the position of any of vehicles 102-110, such as vehicle 110, as vehicle traverses road 502 (see FIG. 5.). In this regard, it should be noted that the system and method may determine the road quality based upon movement of a single vehicle over road 502. Alternatively, and in many embodiments, it is optional but preferable to determine the road quality based on movements of multiple vehicles 102-110 over road 502. Utilization of multiple vehicles allows for more accurate road quality determinations to be made. This increases the frequency at which changes in road quality are detected, allowing for substantially real-time assessment and tracking of road quality during actual road use. Positioning of the fleet of vehicles 102-110 may be determined utilizing the position sensor of node 206 as described above in context of FIGS. 2 and, which allows the position data to be conveyed to computer 136 through network 130 (see FIG. 1). The position data may be transmitted in real time or, alternatively, periodically in batch mode.

Vehicle position data may be collected and/or updated on a substantially continuous basis. In most mining operations, however, the vehicle speeds are comparatively low. For example, speeds may average something less than about 32 km/h (about 20 mi/h), which is approximately 9 m/s (about 30 ft/s). Therefore, bandwidth may be preserved by sampling less frequently. By way of example, in one embodiment, the vehicle position data may be updated about once per second.

The position sensor of node 206 may be any one of a wide range of sensors and sensing systems that are known to the art. Any type of positioning sensor may be utilized, such as a global positioning system (GPS) sensor. This also possible to use an odometer reading to assess position on road 502 when the distance of road 502 is known.

Step 404 entails measuring at least one suspension strut parameter as a vehicle, such as vehicle 110, traverses road 502. The suspension strut parameter may be utilized by computer 136 (see FIG. 1) to determine localized quality of road 502 as the road 502 is being traversed by vehicle. This suspension strut parameter may be the actual pressure in at least one strut 304 as shown in FIG. 3. As discussed above, the suspension strut parameter may alternatively be an accelerometer reading or a determination of strut cylinder stroke. The sensed measurements indicate suspension displacements caused by bumps and uneven surfaces of road 502. The suspension strut parameter data may be transmitted over network 130 to facilitate, for example, road quality analytics that may be performed by computer 136. The suspension strut parameter data may be transmitted to computer 136 on a substantially continuous basis, or transmission may occur periodically in batch mode.

The suspension strut parameter data may be associated 406 with the vehicle location. This association of data sets allows computer 136 to determine road quality and various positions or segments along road 502. For example, in an embodiment where the vehicle position data are updated about once per second, the computer 136 will be able to determine road quality at the same interval, i.e., about once per second. Thus, at a vehicle travel speed of about 32 km/h (about 20 mi/h or 30 ft/s), computer 136 may be capable of determining road quality about every 9 m (about 30 ft). Of course, slower travel speeds allow computer 136 to determine road quality for even shorter road segments. Alternatively, the computing may be done utilizing the processing node 212 of vehicle network 200 (see FIG. 2).

The data sampling rates for vehicle position in step 402 may differ from the data sampling rates for strut pressure in step 402. In this circumstance, it is possible to broadcast all such data on network 130, or else the data may be pre-processed on processing node 212 (see FIG. 2). According to one embodiment, this pre-processing may entail, for example, averaging the strut pressure data and position date over intervals of time. These intervals of time may be the same for the strut pressure data and the positon data, or the intervals may be different.

Figure 6:
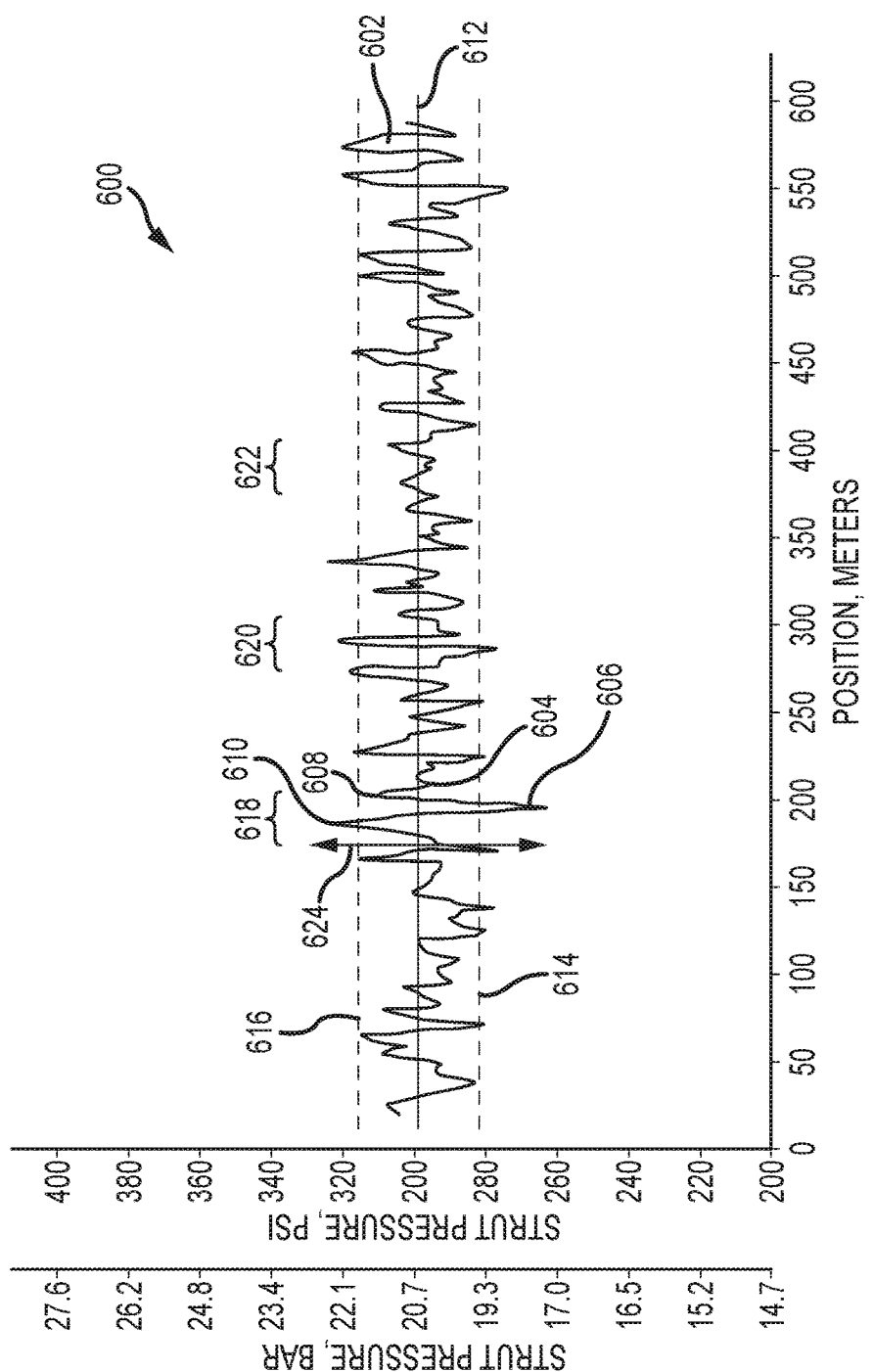
FIG. 6 is a plot of suspension strut pressure versus position on the road of FIG. 5 with the plot is annotated to show various analytical aspects in the assessment of road quality.

Processing step 408 entails the identification of local maxima and minima in the strut pressure data. FIG. 6 shows the analysis for this identification by way of example. Graph 600 maps strut pressure as a function of positon on road 502. The X-axis is provided in meters located from the start of road 502; however, each positon may be associated with a GPS-based latitude-longitude. The Y-axis of curve 602 represents strut pressure readings that are optionally but preferably averaged over a periodic interval of time. This interval of time may be, for example, five, ten, fifteen, twenty, twenty five or thirty seconds where the position on the X-axis represents an average position for this interval of time. Alternatively, another curve smoothing technique other than averaging may be utilized to mitigate noise and reduce the complexity of computing.

Techniques known to the art, such as finite difference techniques, may be utilized to identify local maxima and minima. These local maxima and minima include, for example, minima peak 604 adjacent to maxima peak 608 and minima peak 606 adjacent to maxima peak 610. Suitable finite difference techniques include, for example calculation of first forward differences, first backward differences, or other approximations of the local slope of curve 602 where the maxima and minima are determined as a slope of approximately 0 or where the slope transitions from a positive value to a negative value.

In one type of comparison, the total magnitude of adjacent peaks may be utilized to assess poor road quality. This is shown as line 624, which indicates the total magnitude of strut pressure between the adjacent maxima and minima peaks 606, 610. In this type of comparison, step 410 entails setting a threshold, which may be accomplished by using a magnitude value that experience on a particular road or with a particular type of vehicle confirms is associated with a need for road repair. The total magnitude of line 624 may be compared to this threshold value to indicate poor road quality. Alternatively, the total magnitude of all adjacent maxima and minima peaks may be compared on a rolling basis with poor road quality being indicated by a comparative delimiter, such as a quartile ranking with road quality threshold being indicated as the top 25% in magnitude.

Other comparisons may be utilized to assess poor road quality. As shown by way of example in FIG. 6, the curve 602 may be processed to provide a correlation 612 approximating a mean or mode of the strut pressure data. The correlation 612 may be, for example, a first-order least squares fit. It will be appreciated that in circumstances where the average strut pressure may vary on an incline or where the vehicle automatically adjusts suspension strut pressure, correlation 612 may be a multiple order or multidimensional fit where the multidimensional fit may include, for example, a third axis indicating the incline of road 502.

In this instance, step 410 then entails bounding curve 602 by a threshold, such as confidence interval 614, 616 to establish a threshold amplitude. The confidence interval 614, 616 is calculated by means known to the art and may be based upon, for example, a normal distribution, a binomial distribution, or a triangular distribution, complementary to the nature of statistical distribution of data points forming curve 602.

The range of confidence interval 614, 616 provides a threshold that may be utilized to assess 412 the amplitude of local maxima and minima, such as peaks 604, 606, 608, 610, as an indicator of road quality. By way of example, curve 602 may be divided into a series of sequential position intervals, such as intervals 618, 620, 622 approximating 50 meters each. The interval 618 includes peaks 606, 610 respectively extending below and above the confidence interval 614, 616. In such situations as this where a determination 414 is made that a peak falls outside the confidence interval 614, 616, this indicates poor road quality 418. This finding causes the system to initiate a bad road report 420 that optionally causes personnel to inspect 422 that interval of road 502 located at approximately 170-200 m. A decision 424 is then made whether to maintain 426 the road 502 at that interval. This decision may be made using a variety of factors, such as the severity of amplitudes outside the confidence interval 614, 616 and the rate of increase in this severity.

Conversely, peaks 604, 608 fall within the confidence interval 614, 616 indicating good or acceptable road quality 416.

The confidence interval 614, 616 may be expressed as a percentage, such as a 75% confidence, and may be calculated in a variety of ways known to the art utilizing a data stream from vehicle 110. While this is preferable it is also computationally expensive and is not strictly necessary. Alternatively, the confidence interval 614, 616 as discussed above may be replaced by a threshold amplitude that is experientially based as an indicator of poor road quality. One way of assessing the threshold is to ascertain characteristics of curve 602 that are associated, in actual experience, with a reduction in vehicle speed.

Determination of whether an observed amplitude of maxima and minima falls outside the threshold range may be calculated as a difference where, for example, the absolute values of confidence interval line 614 is subtracted from the absolute value of the amplitude associated with peak 606. Alternatively, it is also possible to determine the threshold that is established in step 410 as a dimensionless value calculated as the value of a ratio between the value of correlation 612 and the amplitude of local maxima and minima. Alternatively, the ratio may be determined as between the value of confidence interval boundaries 614, 616 and the amplitude of local maxima and minima. Any means of comparison known to the art may be utilized for this purpose.

Figure 7:
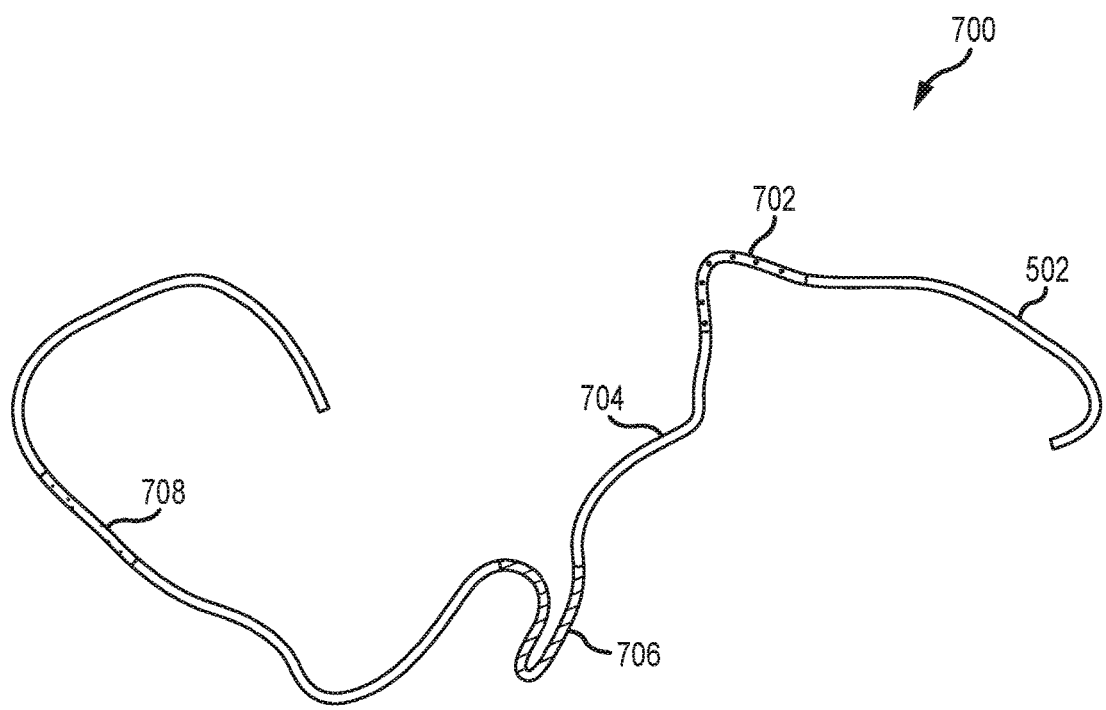
FIG. 7 is a heat map that may be generated to illustrate road quality determinations on a relative scale produced by the method of FIG. 3.

Status of road 502 is optionally but preferably flagged 416, 418 for reporting to computer 136, which provides further processing 428 to create a graphical display 700 as shown by way of example in FIG. 7. The values may be classified on a relative scale of severity according to the amplitude of those local maxima and/or minima that exceed the confidence interval boundaries 614, 616 at particular positons along road 502. Accordingly, the graphical display 700 maybe referred to as a 'heat map' indicating the road quality status of road 502. By way of example, the hashing or color of section 702 may indicate that the road is of bad quality but of relatively minor severity that is not yet in need of repair. Section 704 is not specially hashed or colored, which indicates good road quality. Section 706 is specially hashed or colored to indicate a bad road quality that is in need of repair. Section 708 is specially hashed or colored to indicate that road maintenance operations are underway at that location. Logistics preceding these operations may be automated by a request emanating from computer 136 as part of process step 426.

Those of ordinary skill in the art will appreciate that the foregoing discussion may be subjected to insubstantial changes without departing from the scope and spirit of the invention. Accordingly, the inventors hereby state their

The invention claimed is:

1. A method of determining road quality, comprising:
    traversing the road with a vehicle;
    tracking a position of the vehicle as the vehicle traverses one or more segments of the road;
    measuring a suspension strut parameter of the vehicle as the vehicle traverses the road;
    associating the measured suspension strut parameter with vehicle position;
    establishing a threshold range of the suspension strut parameter, values outside of this threshold range being indicative of poor road quality;
    determining instances where an absolute value of the suspension strut parameter exceeds the threshold value as an indicator of poor road quality associated with a portion of the road;
    reporting a quality status of multiple segments of the road; and
    generating a heat map to display relative quality of the multiple segments of the road.

2. The method of claim 1, wherein the step of determining instances includes identifying local maxima and minima and comparing the local maxima and minima to the threshold range.

3. The method of claim 2, wherein the step of comparing the local maxima and minima includes a subtraction.

4. The method of claim 1, wherein the step of establishing a threshold range includes calculating a confidence interval based upon a data array of the suspension strut parameter.

5. The method of claim 1, wherein the step of generating a heat map includes colorizing the multiple segments according to a predetermined quality color scale.

6. The method of claim 1, wherein the step of tracking the position of the vehicle and the step of measuring the suspension strut parameter are conducted at least once every second.

7. The method of claim 1, wherein the step of establishing a threshold range includes associating a vehicle speed reduction with an amplitude of the suspension strut parameter.

8. The method of claim 1, further including a step of automating a request for inspection of the at least one road segment when the suspension strut parameter falls outside of the threshold range.

9. The method of claim 8, further including a step of automating a request for maintenance of the at least one road segment following the request for inspection.

10. The method of claim 1, wherein the steps of tracking a position and measuring a suspension strut parameter are performed on the vehicle, and further comprising steps of:
    averaging the position data and the suspension strut parameter data over an interval of time to provide an averaged data set; and
    transmitting the averaged data set to a central computing location where the steps of establishing the threshold range, determining instances, and reporting the quality are performed.

11. The method of claim 1, wherein the road is a mining road and the vehicle is a heavy vehicle capable of moving earthen materials obtained from the mine.

12. The method of claim 1, wherein the step of tracking the position includes collecting GPS position data as the vehicle traverses the road.

13. A system for determining road quality, comprising:
    a vehicle having at least one suspension strut;
    a sensor operatively associated with the suspension strut of the vehicle for sensing a suspension strut parameter indicative of road quality;
    a position sensor operatively associated with the vehicle for determining a position of the vehicle on the road;
    a vehicle network mounted on the vehicle and operatively configured for transmitting output representative of the suspension strut parameter and the position of the vehicle;
    a central computing location;
    a telecommunications network constructed and arranged for communicating data between the vehicle network and the central computing location;
    a display operatively associated with the central computing location;
    the system being provided with program logic for implementing the method of claim 1.

14. The system of claim 13, wherein the road is a mining road and the vehicle is a heavy vehicle capable of moving earthen materials obtained from the mine.

15. The system of claim 13, wherein the program logic for determining instances includes program logic for identifying local maxima and minima and comparing the local maxima and minima to the threshold range.

16. The system of claim 13, wherein the program logic for tracking the position of the vehicle and the program logic for measuring the suspension strut parameter generates data at least once every second.

17. A non-transitory computer-readable storage medium having computer-executable attractions embodied thereon that, when executed by at least one computer processor cause the processor to execute the method of claim 1.

18. A method of determining the quality of a road, comprising:
    traversing the road with a vehicle;
    tracking a position of the vehicle as the vehicle traverses the road;
    measuring a suspension strut pressure of the vehicle as the vehicle traverses the road;
    correlating the measured suspension strut pressure with vehicle position on the road;
    identifying local minima and maxima of the measured suspension strut pressure;
    determining an amplitude between the local minima and the local maxima;
    averaging the amplitudes of a plurality of local minima and maxima to produce an average amplitude;
    determining whether the average amplitude exceeds a predetermined threshold, wherein an average amplitude that is less than the predetermined threshold corresponds to a road segment of quality 'good' and wherein an average amplitude that is greater than the predetermined threshold corresponds to a road segment of quality 'bad;' and
    generating a heat map of the quality of the road segments along the road.

19. The method of claim 18, wherein determining whether the average amplitude exceeds a predetermined threshold comprises:
    determining a lower threshold;
    determining an upper threshold, wherein an average amplitude that is less than the lower threshold corresponds to a good quality road segment and wherein an average amplitude that is greater than the upper threshold corresponds to a bad quality road segment.

20. The method of claim 19, wherein measuring the suspension strut pressure comprises measuring a suspension strut pressure in units of pounds per square inch gauge (psig), and wherein the lower threshold is determined to be a first pressure in psig and wherein the upper threshold is determined to be a second pressure in psig.

21. The method of claim 20, wherein said generating the heat map comprises coloring road segments having good road quality about a color yellow and coloring road segments having bad road quality about a color red.

22. The method of claim 18, wherein tracking the position of the vehicle and measuring the suspension strut pressure are conducted once every second.

23. The method of claim 18, wherein tracking the position of the vehicle comprises collecting GPS position data as the vehicle traverses the road.

24. The method of claim 18, wherein the predetermined threshold is based on a percentage speed reduction for the vehicle traversing a bad road segment.

25. A system for determining the quality of a road, comprising:
- a network;
- a vehicle having at least one suspension strut;
- at least one position sensor operatively associated with said vehicle, said position sensor sensing a position of said vehicle, said position sensor being operatively connected to said network;
- at least pressure sensor operatively associated with the suspension strut of said vehicle, said pressure sensor sensing a suspension strut pressure, said pressure sensor being operatively connected to said network;
- a processing system operatively associated with said network; and
- a display system operatively associated with said processing system, wherein said processing system is configured to:
  - record the suspension strut pressure and position of the vehicle as the vehicle traverses the road;
  - correlate the suspension strut pressure with vehicle position on the road;
  - identify local minima and maxima of the suspension strut pressure;
  - determine an amplitude between the local minima and the local maxima;
  - average the amplitudes of a plurality of local minima and maxima to produce an average amplitude; and
  - display a heat map of road quality along the road, the road quality being based on the average amplitudes.

* * * * *

UNITED STATES PATENT AND TRADEMARK OFFICE
CERTIFICATE OF CORRECTION

PATENT NO. : 10,378,160 B2
APPLICATION NO. : 15/376044
DATED : August 13, 2019
INVENTOR(S) : Mary Amelia Walker et al.

Page 1 of 1

It is certified that error appears in the above-identified patent and that said Letters Patent is hereby corrected as shown below:

In the Claims

Claim 18, Column 10, Line 54: Delete "'bad;'" and insert --'bad';--.

Claim 25, Column 12, Line 3: After at least, insert --one--.

Signed and Sealed this
Fifteenth Day of October, 2019

Andrei Iancu
*Director of the United States Patent and Trademark Office*